United States Patent
Matsutani et al.

(10) Patent No.: US 6,906,704 B2
(45) Date of Patent: Jun. 14, 2005

(54) NOISE ELIMINATION METHOD AND NOISE ELIMINATION APPARATUS

(75) Inventors: Takashi Matsutani, Osaka (JP); Gen Sasaki, Osaka (JP)

(73) Assignee: Mega Chips Corporation, Osaka (JP)

( * ) Notice: Subject to any disclaimer, the term of this patent is extended or adjusted under 35 U.S.C. 154(b) by 324 days.

(21) Appl. No.: 10/347,623

(22) Filed: Jan. 22, 2003

(65) Prior Publication Data

US 2003/0138166 A1 Jul. 24, 2003

(30) Foreign Application Priority Data

Jan. 24, 2002 (JP) ........................ 2002-015520

(51) Int. Cl.[7] .............................. G06K 9/40; G09G 5/00
(52) U.S. Cl. ...................... 345/204; 382/260; 382/264; 382/275; 348/231.6; 348/241
(58) Field of Search .............................. 382/260, 264, 382/275; 348/231.6, 241; 345/204

(56) References Cited

U.S. PATENT DOCUMENTS

| | | | | |
|---|---|---|---|---|
| 4,573,070 A | * | 2/1986 | Cooper ........................ 348/617 |
| 4,918,633 A | * | 4/1990 | Sullivan ....................... 382/275 |
| 6,567,468 B1 | * | 5/2003 | Kato et al. .............. 375/240.12 |
| 6,667,766 B2 | * | 12/2003 | Matsutani et al. ........... 348/241 |
| 2002/0191858 A1 | * | 12/2002 | Sindhu ......................... 382/261 |
| 2003/0138160 A1 | * | 7/2003 | Ishikawa ..................... 382/260 |

* cited by examiner

*Primary Examiner*—Sumati Lefkowitz
*Assistant Examiner*—Alexander S. Beck
(74) *Attorney, Agent, or Firm*—Oblon, Spivak, McClelland, Maier & Neustadt, P.C.

(57) ABSTRACT

A noise elimination method of the present invention includes the steps of: detecting a zigzag signal in which a differential value between signal levels of two pixels which are adjacent to each other along a horizontal pixel direction or a vertical pixel direction alternately takes a positive value and a negative value (ST2); determining whether or not the zigzag signal forms a stripe pattern (ST3); regarding the zigzag signal as a normal image signal when the zigzag signal is determined as forming a stripe pattern (ST4); regarding the zigzag signal as a noise signal and extracting the same when the zigzag signal is determined as not forming a stripe pattern (ST5); and filtering this noise signal (ST6).

14 Claims, 7 Drawing Sheets

NOISE ELIMINATION METHOD AND NOISE ELIMINATION APPARATUS

BACKGROUND OF THE INVENTION

1. Field of the Invention

The present invention relates to a noise elimination method and a noise elimination apparatus for detecting and eliminating a noise signal mixed into an image signal captured at an image pickup sensor of a digital camera or the like.

2. Description of the Background Art

Figure 10:
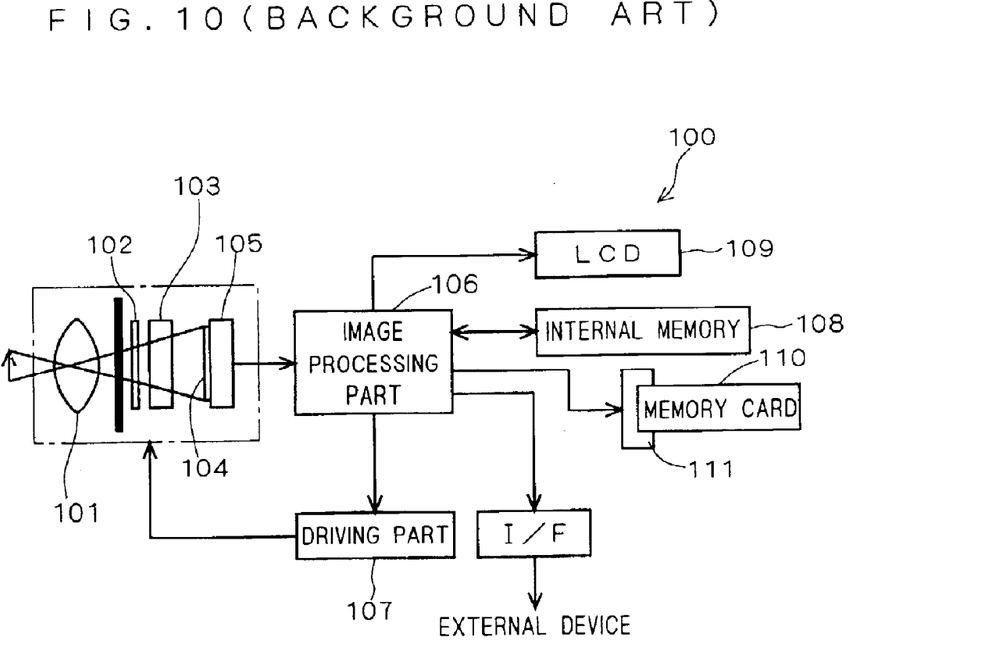
FIG. 10 is a block diagram showing a schematic configuration of a common digital still camera.

FIG. 10 is a block diagram showing a schematic configuration of a common digital still camera. As shown in the figure, in a digital camera 100, an image signal captured by an image pickup sensor 105 such as CCD sensor or CMOS sensor is converted into a digital signal by A/D conversion, and then subjected to a variety of image processings such as pixel interpolation, color space conversion, edge enhancement at an image processing part 106. The image data after subjected to such image processings is then displayed on a LCD (Liquid Crystal Display) 109 or the like, compression-encoded in the JPEG (Joint Photographic Experts Group) format, for example, and stored in a memory card 110 such as a nonvolatile memory, or outputted to an external device such as a personal computer via an interface 111. In FIG. 10, a reference numeral 101 denotes an optical lens, a reference numeral 102 denotes a color correction filter, a reference numeral 103 denotes an optical LPF (Low-Pass Filter), a reference numeral 104 denotes a color filter array, a reference numeral 107 denotes a driving part for driving and controlling the image pickup sensor 105 and the like.

Figure 11:
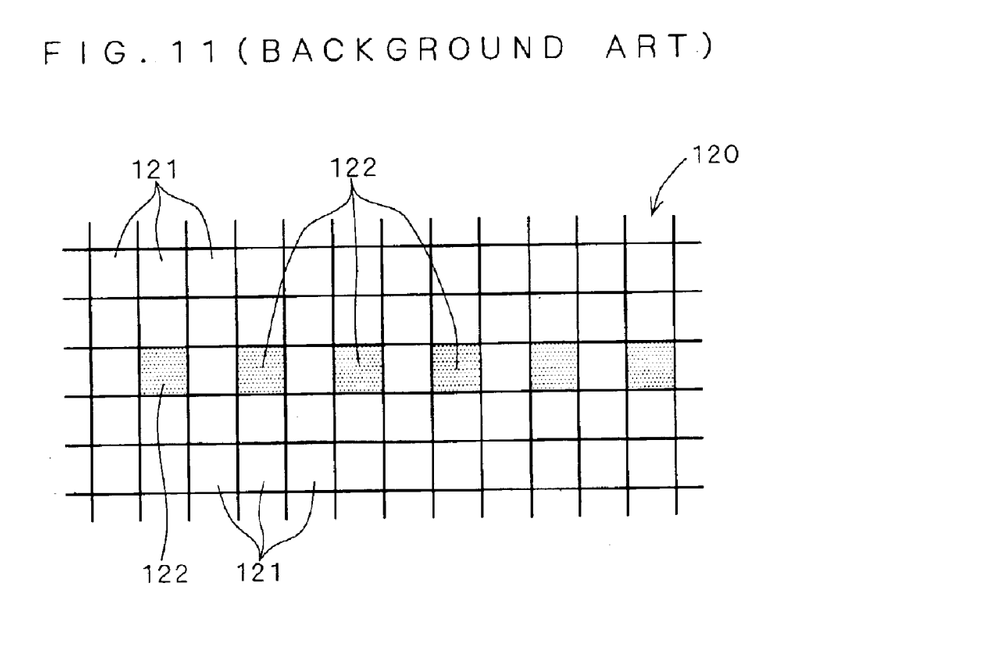
FIG. 11 is a view showing one example of image data including noise signals distributed in a dotted pattern.
Figure 12:
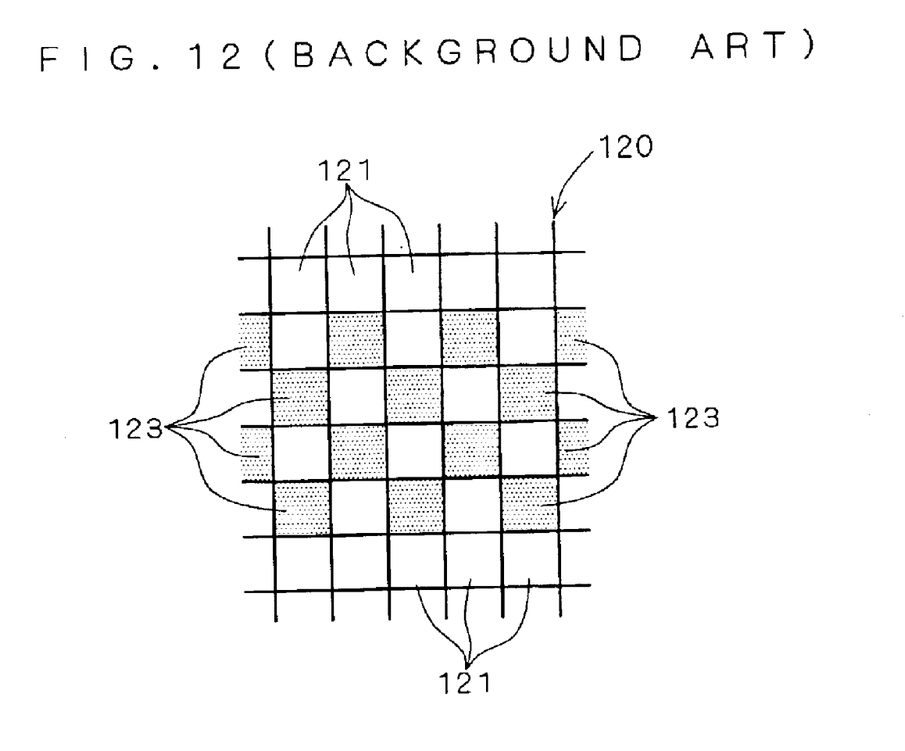
FIG. 12 is a view showing one example of image data including noise signals distributed in a checkered pattern.

However, this configuration raises the problem that noise signals get mixed into the image signal captured at the image pickup sensor 105 during the A/D conversion, pixel interpolation and the like processes, to deteriorate the image quality. If such an image signal including noise signals is subjected to an edge enhancement process, the noise signals are also enhanced, to cause the problem of further deteriorating the image quality. Such kinds of noise signals may result from the hardware configuration of the A/D converter, or result from interpolating a current pixel using peripheral pixel values in the pixel interpolation process. Especially in the frequency components in the vicinity of the Nyquist frequency, noise signals 122, 122, ... distributed in a dotted pattern as shown in FIG. 11 and noise signals 123, 123, ... distributed in a checkered pattern as shown in FIG. 12 are likely to appear. FIG. 11 and FIG. 12 are schematic views showing an image signal 120 made up of a plurality of pixels 121, 121, ... arranged in matrix. In the example shown by FIG. 11, the noise signals 122, ... having signal levels higher than the normal signal level in the other pixels 121, ... appear in a dotted pattern, and in the example shown by FIG. 12, the noise signals 123, ... having signal levels higher than the normal signal level in the other pixels 121, ... appear in a checkered pattern.

Since it is difficult to eliminate such noise signals individually, a LPF (Low-Pass Filter) which allows passage of low frequency components and reduction of high frequency components is caused to act on the entire image signal so as to blur the noise signals. However, according to this measure, also the edge portions are blurred as well, leading the problem that the resolution power is deteriorated.

SUMMARY OF THE INVENTION

It is an object of the present invention to provide a noise elimination method and a noise elimination apparatus capable of eliminating a noise signal mixed into an image signal without deteriorating the image quality.

According to a first aspect of the present invention, a noise elimination method eliminates a noise signal mixed into a two-dimensional image signal, and includes the steps of (a) detecting a zigzag signal in which a differential value between signal levels of two pixels which are adjacent to each other along a horizontal pixel direction or along a vertical pixel direction in the two-dimensional image signal alternately takes a positive value and a negative value, (b) determining whether or not the zigzag signal detected in the step (a) forms a stripe pattern, (c) regarding the zigzag signal as a normal image signal when the zigzag signal is determined as forming a stripe pattern in the step (b), (d) regarding the zigzag signal as a noise signal and extracting the same when the zigzag signal is determined as not forming a stripe pattern in the step (b), and (e) filtering the noise signal extracted in the step (d) from the two-dimensional image signal.

According to a second aspect of the present invention, in the noise elimination method according to the first aspect, the step (e) includes the step of filtering the noise signal by means of a low-pass filter.

According to a third aspect of the present invention, in the noise elimination method according to the first or second aspect, the step (a) further includes the step of, when an absolute differential value between signal levels of two pixels which are adjacent to each other along the horizontal pixel direction or the vertical pixel direction is equal to or less than a predetermined threshold, regarding these two signal levels of adjacent two pixels as being the same.

According to a fourth aspect of the present invention, in the noise elimination method according to the third aspect, the threshold is variably set.

According to a fifth aspect of the present invention, in the noise elimination method according to any of the first to fourth aspects, when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0], a signal satisfying at least one of the following relational expressions (A1) and (A2) is detected as the zigzag signal in the step (a), and the zigzag signal is determined as forming the stripe pattern when at least one of the following relational expressions (A3) and (A4) is satisfied in the step (b).

$$I[0, -2] > I[0, -1] \text{ and } I[0, -1] < I[0, 0] \text{ and } I[0, 0] > I[0, 1] \quad (A1)$$

$$I[0, -1] < I[0, 0] \text{ and } I[0, 0] > I[0, 1] \text{ and } I[0, 1] < I[0, 2] \quad (A2)$$

$$I[-1, -1] < I[-1, 0] \text{ and } I[-1, 0] > I[-1, 1] \quad (A3)$$

$$I[1, -1] < I[1, 0] \text{ and } I[1, 0] > I[1, 1] \quad (A4)$$

According to a sixth aspect of the present invention, in the noise elimination method according to any of the first to fourth aspects, when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0], a signal satisfying at least one of the following relational expressions (B1) and (B2) is detected as the zigzag signal in the step (a), and the zigzag signal is determined as forming the stripe pattern when at least one of the following relational expressions (B3) and (B4) is satisfied in the step (b).

$I[0, -2]<I[0, -1]$ and $I[0, -1]>I[0, 0]$ and $I[0, 0]<I[0, 1]$     (B1)

$I[0, -1]>I[0, 0]$ and $I[0, 0]<I[0, 1]$ and $I[0, 1]>I[0, 2]$     (B2)

$I[-1, -1]>I[-1, 0]$ and $I[-1, 0]<I[-1, 1]$     (B3)

$I[1, -1]>I[1, 0]$ and $I[1, 0]<I[1, 1]$     (B4)

According to a seventh aspect of the present invention, in the noise elimination method according to the fifth or sixth aspect, in the step (e), the noise signal is eliminated by correcting the signal level I[0, 0] at the current pixel in accordance with the following expression (C1) using a filter coefficient K(n) satisfying the following expression (C2).

$$I[0, 0] \leftarrow \sum_{n=-M/2}^{M/2} K(n) \times I[0, n] / 2^m \quad (C1)$$

(wherein M: even number, m: integer of 2 or more)

$$\sum_{n=-M/2}^{M/2} K(n) = 2^m \quad (C2)$$

According to an eighth aspect of the present invention, a noise elimination apparatus eliminates a noise signal mixed into a two-dimensional image signal, and includes a signal detecting part for detecting a zigzag signal in which a differential value between signal levels of two pixels which are adjacent to each other along a horizontal pixel direction or along a vertical pixel direction in the two-dimensional image signal alternately takes a positive value and a negative value; a determining part for determining whether or not the zigzag signal detected by the signal detecting part forms a stripe pattern; a noise signal extracting part for regarding the zigzag signal as a normal image signal when the zigzag signal is determined as forming a stripe pattern by the determining part, while regarding the zigzag signal as a noise signal and extracting the same when the zigzag signal is determined as not forming a stripe pattern; and a filter for eliminating the noise signal from the two-dimensional image signal.

According to a ninth aspect of the present invention, in the noise elimination apparatus according to the eighth aspect, the filter is a low-pass filter which eliminates the noise signal by filtering.

According to the tenth aspect of the present invention, in the noise elimination apparatus according to the eighth or ninth aspect, when an absolute differential value between signal levels of two pixels which are adjacent to each other along the horizontal pixel direction or the vertical pixel direction is equal to or less than a predetermined threshold, the signal detecting part regards these two signal levels of adjacent two pixels as being the same.

According to an eleventh aspect of the present invention, the noise elimination apparatus according to the tenth aspect further includes a threshold setting part for variably setting the threshold.

According to a twelfth aspect of the present invention, in the noise elimination apparatus according to any of the eighth to eleventh aspects, when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0], the signal detecting part detects a signal satisfying at least one of the following relational expressions (A1) and (A2) as the zigzag signal, and the determining part determines the zigzag signal as forming a stripe pattern when at least one of the following relational expressions (A3) and (A4) is satisfied.

$I[0, -2]>I[0, -1]$ and $I[0, -1]<I[0, 0]$ and $I[0, 0]>I[0, 1]$     (A1)

$I[0, -1]<I[0, 0]$ and $I[0, 0]>I[0, 1]$ and $I[0, 1]<I[0, 2]$     (A2)

$I[-1, -1]<I[-1, 0]$ and $I[-1, 0]>I[-1, 1]$     (A3)

$I[1, -1]<I[1, 0]$ and $I[1, 0]>I[1, 1]$     (A4)

According to a thirteenth aspect of the present invention, in the noise elimination apparatus according to any of the eighth to eleventh aspects, when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0], the signal detecting part detects a signal satisfying at least one of the following relational expressions (B1) and (B2) as the zigzag signal, and the determining part determines the zigzag signal as forming the stripe pattern when at least one of the following relational expressions (B3) and (B4) is satisfied.

$I[0, -2]<I[0, -1]$ and $I[0, -1]>I[0, 0]$ and $I[0, 0]<I[0, 1]$     (B1)

$I[0, -1]>I[0, 0]$ and $I[0, 0]<I[0, 1]$ and $I[0, 1]>I[0, 2]$     (B2)

$I[-1, -1]>I[-1, 0]$ and $I[-1, 0]<I[-1, 1]$     (B3)

$I[1, -1]>I[1, 0]$ and $I[1, 0]<I[1, 1]$     (B4)

According to a fourteenth aspect of the present invention, in the noise elimination apparatus according to the twelfth or thirteenth aspect, the filter eliminates the noise signal by correcting the signal level I[0, 0] at the current pixel in accordance with the following expression (C1) using a filter coefficient K(n) satisfying the following expression (C2).

$$I[0, 0] \leftarrow \sum_{n=-M/2}^{M/2} K(n) \times I[0, n] / 2^m \quad (C1)$$

(wherein M: even number, m: integer of 2 or more)

$$\sum_{n=-M/2}^{M/2} K(n) = 2^m \quad (C2)$$

As described above, according to the noise elimination method and the noise elimination apparatus of the present invention, whether or not the above zigzag signal forms a stripe pattern is determined, and a zigzag signal forming a stripe pattern is regarded as a normal image signal, while a zigzag signal not forming a stripe pattern is regarded as a noise signal. Therefore, detection accuracy of noise signal is improved. Furthermore, since only a noise signal can be selectively eliminated by a filter, it becomes possible to prevent the resolution power from deteriorating due to the noise elimination process.

These and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
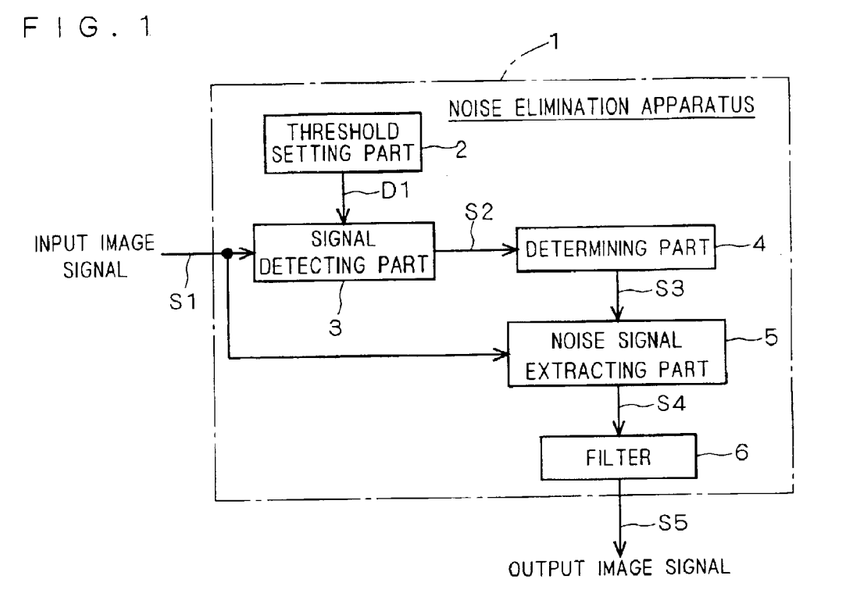
FIG. 1 is a functional block diagram showing a schematic configuration of a noise elimination apparatus according to an embodiment of the present invention.

FIG. 1 is a functional block diagram showing a schematic configuration of a noise elimination apparatus 1 according to an embodiment of the present invention. This noise elimination apparatus 1 includes a signal detecting part 3 for detecting a signal S2 having a zigzag signal level from an input image signal S1 to output the same; a determining part 4 for determining whether or not the zigzag signal S2 is a noise signal; a noise signal extracting part 5 for extracting a noise signal from the image signal S1 based on the determination; and a filter 6 for filtering the extracted noise signal.

As will be described later, the signal detecting part 3 regards adjacent two pixels as having the same signal level when an absolute differential value of signal level between these tow pixels is not more than a threshold D1 supplied from a threshold setting part 2, and detects the zigzag signal S2 only when the absolute differential value exceeds the threshold D1. This threshold D1 can be variably set at the threshold setting part 2.

Figure 2:
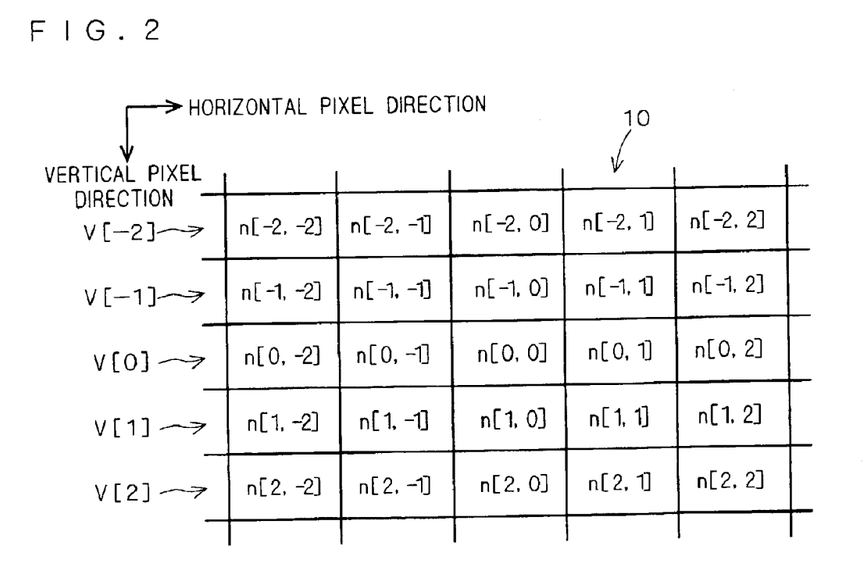
FIG. 2 is a view showing an image format of an image signal inputting to the noise elimination apparatus.

FIG. 2 is a view showing an image format 10 of the input image signal S1. As shown in the figure, in the image format 10, a plurality of pixels n[i, j] (i,j=0, ±1, ±2, ...) are arranged in a matrix pattern along the vertical pixel direction and the horizontal pixel direction. In FIG. 2, the notation n[i, j] represents a pixel located at i-th position in the vertical pixel direction and j-th position in the horizontal pixel direction, and the notation V[k] (k=0, ±1, ±2, ...) represents k-th horizontal line. Hereinafter, a center pixel n[0, 0] among a plurality of pixels to be processed is referred to as a "current pixel".

Although the present embodiment deals with only noise signals distributed in the horizontal pixel direction, the present invention is not limited to this. By inverting (transposition) signal components of an image signal between the horizontal pixel direction and the vertical pixel direction, a noise elimination process as will be described later can also be adapted to noise signals distributed in the vertical pixel direction.

Figure 3:
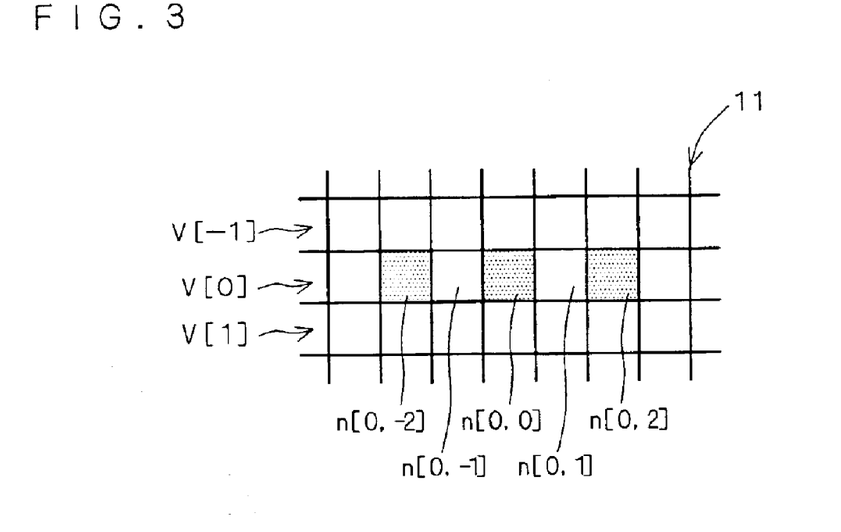
FIG. 3 is a schematic view showing an example of image data.
Figure 4:
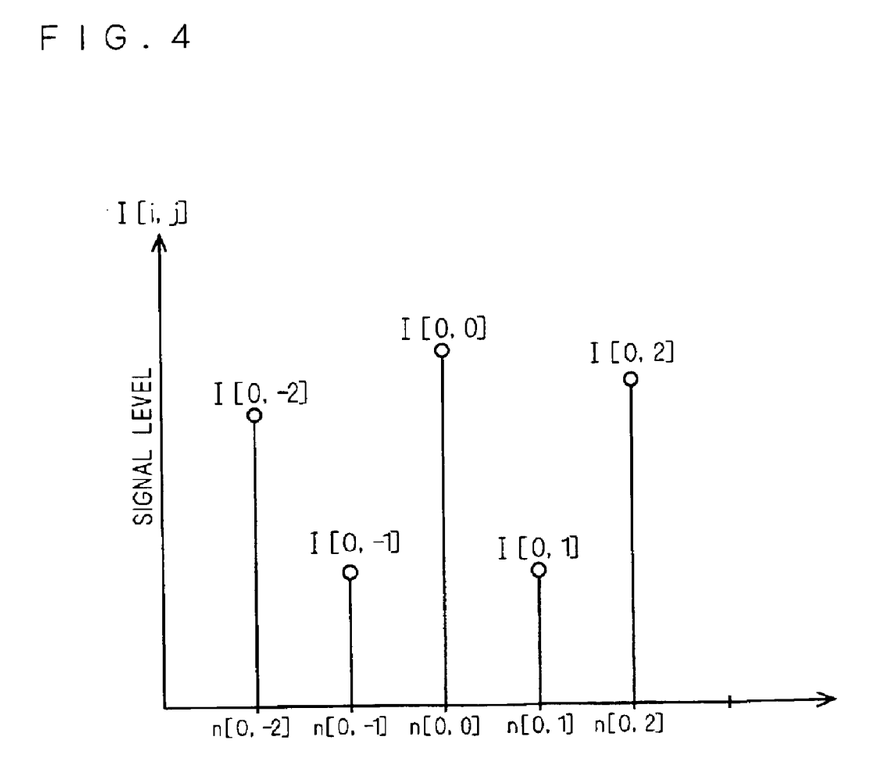
FIG. 4 is a graph showing a signal level distribution of image data.

FIG. 3 is a schematic view showing an example of image data 11 represented in the image format 10 shown in FIG. 2. The image data 11 includes noise signals n[0, −2], n[0, 0], n[0, 2], ... distributed in a dotted pattern in the horizontal direction along the horizontal line V[0]. FIG. 4 is a graph showing an example of signal levels on the horizontal line V[0] shown in FIG. 3. In this drawing, a signal level at n[i,j] is represented by I[i, j]. The signal levels I[i, j] are distributed in a zigzag pattern so that differential values between two pixels that are adjacent to each other along the horizontal line alternately take a positive value and a negative value. As described above, it is known that noise signals having such a distribution get mixed into the image signal S1 during A/D conversion, pixel interpolation and the like processes.

Figure 5:
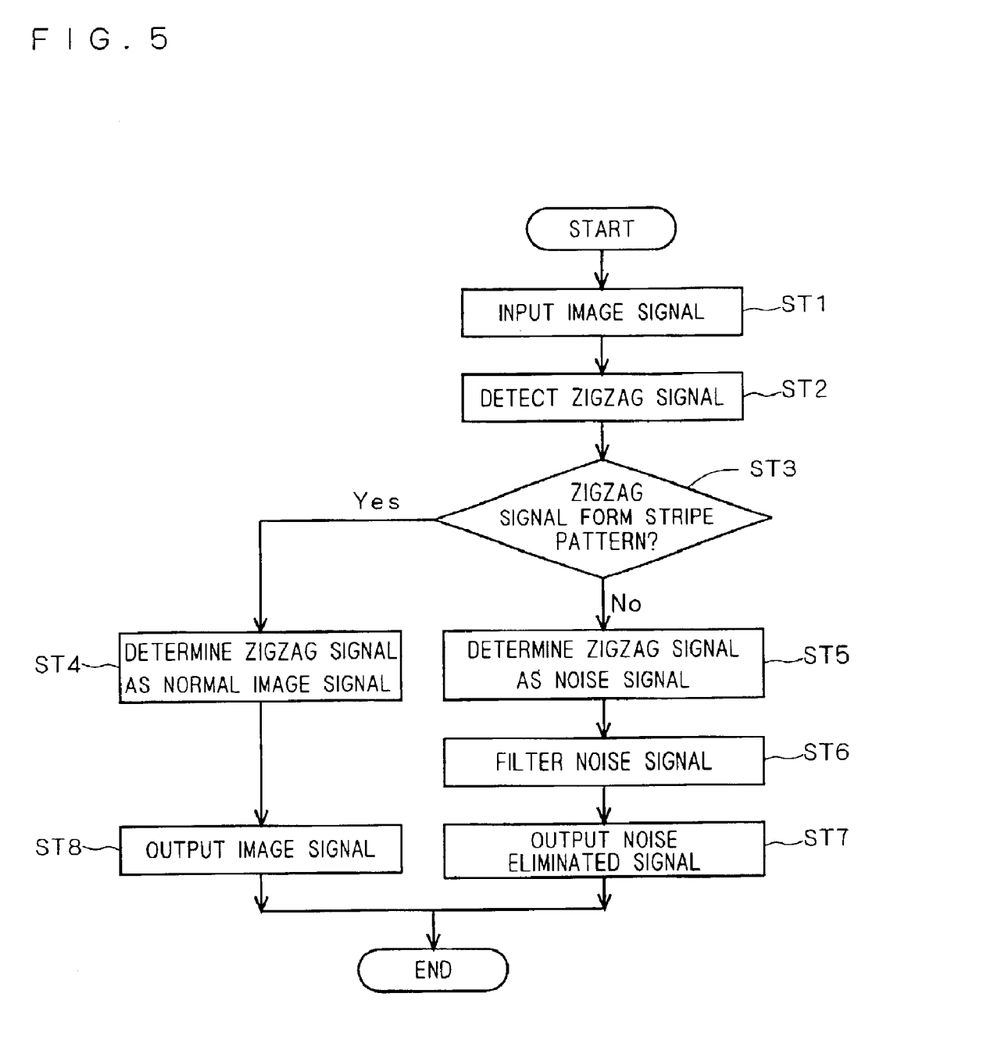
FIG. 5 is a flow chart showing a noise elimination method according to the present embodiment.

A method for eliminating a noise signal using the aforementioned noise elimination apparatus 1 will now be described while referring to the flow chart of FIG. 5. First, an input image signal S1 outputted from an image pickup device (not shown) and subjected to A/D conversion, pixel interpolation and the like processes inputs to the noise elimination apparatus 1 (step ST1).

Figure 6:
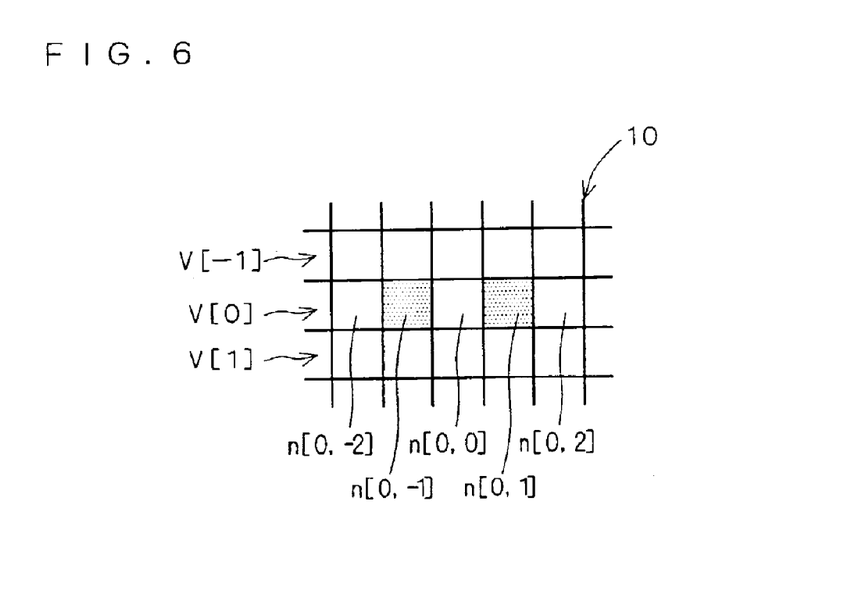
FIG. 6 is a graph showing an example of image data.
Figure 8:
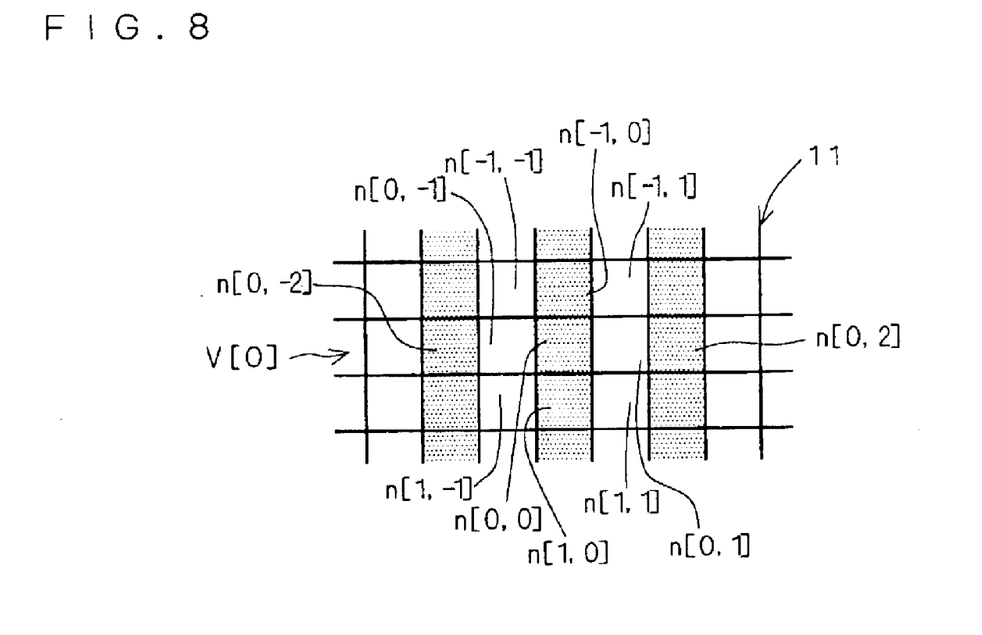
FIG. 8 is a graph showing an example of image data.
Figure 9:
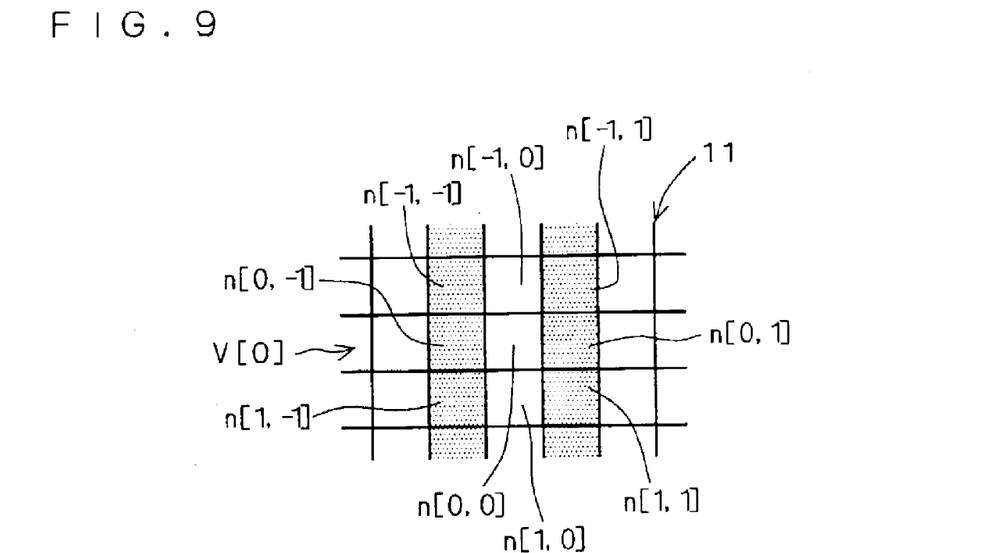
FIG. 9 is a graph showing an example of image data.

At next step ST2, the signal detecting part 3 holds a signal for a pixel area including 5 pixels×5 pixels from the input image signal S1, and when the signal levels are distributed in a zigzag manner along the vertical pixel direction or the horizontal pixel direction in the surrounding of a current pixel n[0, 0] which is the center pixel of the pixel area in question, detects and outputs the zigzag signal S2. Then the determining part 4 determines whether or not the zigzag signal S2 inputted from the signal detecting part 3 is a noise signal (step ST3), and outputs a determination signal indicating the result of the determination (steps ST4 and ST5). FIGS. 3, 6, 8 and 9 are views showing examples for various image data 11 including such type of zigzag signal. FIGS. 3 and 6 show examples including a noise signal, and FIGS. 8 and 9 show examples including a zigzag signal which is not a noise signal.

In the image data 11 shown in FIG. 3, as shown in the graph of FIG. 4, a zigzag signal is distributed wherein differential values between two pixels that are adjacent to each other along the horizontal line V[0] centered at the current pixel n[0, 0] alternately take a positive value and a negative value. The signal level I[0, 0] of the current pixel n[0, 0] has a value higher than those of the signal levels I[0, −1] and I[0, 1] of the left and right adjacent pixels n[0, −1] and n[0, 1] to the current pixel n[0, 0]. On the other hand, in the horizontal lines V[−1] and V[1] which are adjacent to the lower horizontal line V[0] on the upper and lower sides, a zigzag signal does not appear. Therefore, the zigzag distribution of signal levels in the example shown in FIG. 3 satisfies the following expressions (A1) and (A2).

$$I[0, -2]>I[0, -1] \text{ and } I[0, -1]<I[0, 0] \text{ and } I[0, 0]>I[0, 1] \quad (A1)$$

$$I[0, -1]<I[0, 0] \text{ and } I[0, 0]>I[0, 1] \text{ and } I[0, 1]<I[0, 2] \quad (A2)$$

Figure 7:
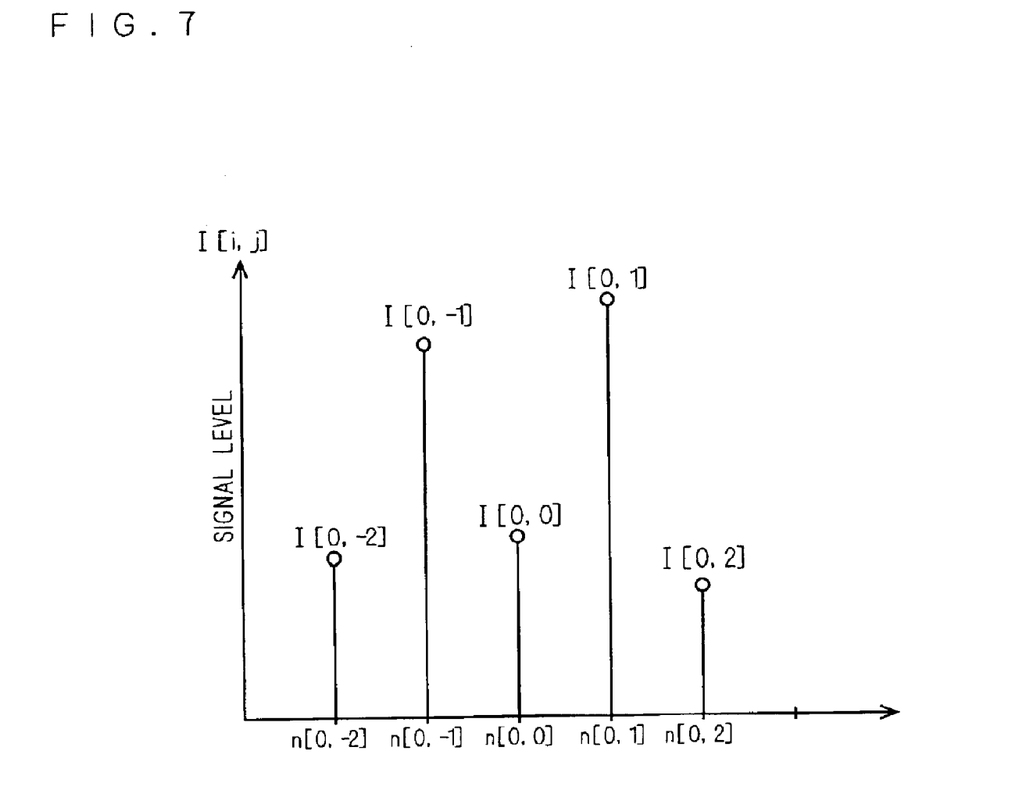
FIG. 7 is a graph showing a signal level distribution of image data.

In the example shown in FIG. 6, a zigzag signal along the horizontal line V[0] as shown in FIG. 3 appears, however, a zigzag signal does not appear in the upper and lower adjacent horizontal lines V[−1] and V[1]. FIG. 7 is a graph showing signal levels which are distributed in a zigzag manner on the horizontal line V[0] including the current pixel n[0, 0]. In this example, the signal level I[0, 0] of the current pixel n[0, 0] has a value lower than those of the signal levels I[0, −1] and I[0, 1] of the left and right adjacent pixels n[0, −1] and n[0, 1] to the current pixel n[0, 0].

Therefore, the zigzag distribution of signal levels in the example shown in FIG. 4 satisfies the following expressions (B1) and (B2).

$$I[0, -2]<I[0, -1] \text{ and } I[0, -1]>I[0, 0] \text{ and } I[0, 0]<I[0, 1] \quad \text{(B1)}$$

$$I[0, -1]>I[0, 0] \text{ and } I[0, 0]<I[0, 1] \text{ and } I[0, 1]>I[0, 2] \quad \text{(B2)}$$

On the other hand, in the image data 11 shown in FIGS. 8 and 9, it can be seen that zigzag signal levels appear in the horizontal line V[0] including the current pixel n[0, 0], while a stripe pattern consisting of vertical bars having a high signal level on alternate pixels and extending in the vertical pixel direction at least in the surrounding of the current pixel n[0, 0] appears. In the image data 11 shown in FIG. 8, the vertical bars can be seen along the vertical line including the current pixel n[0, 0]. In the image data 11 shown in FIG. 9, the vertical line including the current pixel n[0, 0] shows a valley portion of the stripe pattern having low signal levels, and vertical bars can be seen on the two vertical lines including the left and right adjacent pixels n[−1, 0] and n[1, 0] to the current pixel n[0, 0].

In the case of actual signals having a frequency in the vicinity of the Nyquist frequency, a repetition pattern of either horizontal bars along the horizontal pixel direction or vertical bars along the vertical pixel direction often appears. Such type of repetition pattern appears in an image signal, for example, when a blind, balustrades of bridge and the like are imaged as a subject. It is also known that noise signals occurring in an analog circuit or an image processing circuit, particularly, noise signals (error signals) which occur when subjecting image data captured by a single-plate type CCD image pickup device or a CMOS image pickup device to a pixel interpolation process appear in a repetition pattern of 2 pixels×2 pixels. In both of a repetition pattern resulting from a subject and a repetition pattern resulting from an analogue circuit or an image processing circuit, similar zigzag signals appear. These patterns differ from each other in that in the repetition pattern resulting from a subject, a stripe pattern appears in the direction (in this example, vertical pixel direction) perpendicular to the horizontal line V[0] in the surrounding of the current pixel n[0, 0] as shown in FIGS. 8 and 9, while in the repetition pattern resulting from an analogue circuit or an image processing circuit, such kind of stripe pattern is unlikely to appear as shown in FIGS. 3 and 6. The inventors of the present invention focused on this point.

In the above step ST2, the signal detecting part 3 detects a signal which satisfies at least one of the above expressions (A1) and (A2) or satisfies at least one of the above expressions (B1) and (B2) as a zigzag signal S2 to output it to the determining part 4.

At step ST3, the determining part 4 determines whether or not the detected zigzag signal S2 forms a stripe pattern. More specifically, when a signal S2 which satisfies at least one of the above expressions (A1) and (A2) is detected at the signal detecting part 3, the determining part 4 determines whether or not the signal S2 satisfies one or both of the following expressions (A3) and (A4) (ST3).

$$I[-1, -1]<I[-1, 0] \text{ and } I[-1, 0]>I[-1, 1] \quad \text{(A3)}$$

$$I[1, -1]<I[1, 0] \text{ and } I[1, 0]>I[1, 1] \quad \text{(A4)}$$

On the other hand, when a signal S2 which satisfies at least one of the above expressions (B1) and (B2) is detected at the signal detecting part 3, the determining part 4 determines whether or not the signal S2 satisfies one or both of the following expressions (B3) and (B4) (ST3).

$$I[-1, -1]>I[-1, 0] \text{ and } I[-1, 0]<I[-1, 1] \quad \text{(B3)}$$

$$I[1, -1]>I[1, 0] \text{ and } I[1, 0]<I[1, 1] \quad \text{(B4)}$$

The above determining part 4 determines that the signal S2 forms a stripe pattern when the zigzag signal S2 satisfies one or both of the above expressions (A3) and (A4) or when the zigzag signal S2 satisfies one or both of the above expressions (B3) and (B4) (step ST4). Then the determining part 4 regards the signal S2 as a normal image signal and proceeds to step ST8, while the current pixel n[0, 0] is directly outputted to the external. In brief, as the noise signal extracting part 5 receives a determination signal S4 from the determining part 4, it controls so that the input image signal S1 is outputted as an output image signal S5 without being filtered at the filter 6.

On the other hand, when the zigzag signal S2 does not satisfy both of the above expressions (A3) and (A4) or when the zigzag signal S2 does not satisfy both of the above expressions (B3) and (B4), the determining part 4 determines that the signal does not form a stripe pattern, and hence is a noise signal (step ST5). Then, the determining part 4 outputs a determination signal S3 representing that fact to the noise signal extracting part 5. At next step ST6, the noise signal extracting part 5 extracts the noise signal S4 from the input image signal S1 to output it to the filter 6. Then the filter 6 samples a plurality of pixels including the current pixel n[0, 0] and smoothes (filters) the noise signal S4 for the location of the current pixel n[0, 0]. At next step ST7, a resultant image signal S5 is outputted to the external.

The filter 6 may have a function of smoothing a plurality of pixels including at least a total of three pixels including the current pixel n[0, 0] and the left and right adjacent pixels n[−1, 0] and n[1, 0]. Concretely, the filter 6 uses a filter coefficient K(n) satisfying the following expression (C2), and is able to execute the filtering in accordance with the following expression (C1).

$$I[0, 0] \leftarrow \sum_{n=-M/2}^{M/2} K(n) \times I[0, n] / 2^m \quad \text{(C1)}$$

(wherein M: even number, m: integer of 2 or more)

$$\sum_{n=-M/2}^{M/2} K(n) = 2^m \quad \text{(C2)}$$

In this regard, it is desired that the filter coefficient K(n) satisfies the relational expression K(n)=K(−n), or in other words, is symmetric with respect to the current pixel n[0, 0]. 2 to the power ($=2^m$) forming the denominator of the right side member in the above expression (C1) attributes to the fact that a division process using 2 to the power can be executed by a shift calculator when the noise elimination apparatus 1 is implemented by an integrated circuit. When such a division process is executed using a value other than 2 to the power, a disadvantage arises that the gate scale of the integrated circuit increases compared to the case where a shift calculator is used.

For example, when filtering is executed on three pixels, the following expression (C1-0) is established by applying M=2, K(0)=2×K1 and K(±1)=K0 to the above expression (C1).

$$I[0, 0] \leftarrow (K0 \times I[0, -1] + 2 \times K1 \times I[0, 0] + K0 \times I[0, 1])/2^m \quad \text{(C1-0)}$$

In the above expression (C1-0), m represents an integer of 2 or more, and the relational expression K0+K1=$2^{m-1}$ is satisfied.

In addition, from the view point of smoothing, it is preferred that the ratio between the filter coefficient K1 for weighting the signal level I[0, 0] of the current pixel n[0, 0] and the filter coefficient 2×K0 for weighting the signal levels I[−1, 0] and I[1, 0] of the left and right adjacent pixels is small. When m=2, the above expression (C1-0) can be expressed by the following expression (C1-1), wherein the filter coefficients are K0=1 and K1=1.

$$I[0, 0] \leftarrow (I[0, -1] + 2 \times I[0, 0] + I[0, 1])/4 \qquad (C1\text{-}1)$$

From the view point of smoothing, it is preferred that the above expression (C1-0) is expressed by the following expression (C1-2), wherein m=4, K0=5 and K1=3.

$$I[0, 0] \leftarrow (5 \times I[0, -1] + 6 \times I[0, 0] + 5 \times I[0, 1])/2^4 \qquad (C1\text{-}2)$$

The pixels to be sampled in the filtering process at the above step ST6 are a plurality of pixels on a single horizontal line including the current pixel n[0, 0] in the present embodiment, however, the present invention is not limited to this, and a plurality of pixels on plural lines in the surrounding of the current pixel n[0, 0] may be sampled for use in the filtering process.

By the way, at the above step ST2, the signal detecting part 3 proceeds the process by regarding a component where an absolute differential value between adjacent two pixels is less than the threshold D1 as pixels having the same signal level rather than regarding as a zigzag signal. This is because, if signals where a difference between two adjacent pixels is slight are involved in the process, a probability that a noise signal with an irregular pattern having poor correlation is determined as a zigzag signal, with the result that the number of filtering processes increases and hence the resolution power is deteriorated. Since the threshold D1 can be variably set at the threshold setting part 2, it is possible to set the threshold D1 so as to realize an optimum image quality.

While the present invention has been described in detail, the forgoing description is in all aspects illustrative and not restrictive. It is understood that numerous other modifications and variations can be devised without departing from the scope of the present invention.

What is claimed is:

1. A noise elimination method for eliminating a noise signal mixed into a two-dimensional image signal, comprising the steps of:
   (a) detecting a zigzag signal in which a differential value between signal levels of two pixels which are adjacent to each other along a horizontal pixel direction or along a vertical pixel direction in said two-dimensional image signal alternately takes a positive value and a negative value;
   (b) determining whether or not said zigzag signal detected in said step (a) forms a stripe pattern;
   (c) regarding the zigzag signal as a normal image signal when said zigzag signal is determined as forming a stripe pattern in said step (b);
   (d) regarding the zigzag signal as a noise signal and extracting the same when said zigzag signal is determined as not forming a stripe pattern in said step (b); and
   (e) filtering said noise signal extracted in said step (d) from said two-dimensional image signal.

2. The noise elimination method according to claim 1, wherein
   said step (e) includes the step of filtering said noise signal by means of a low-pass filter.

3. The noise elimination method according to claim 1 or 2, wherein
   said step (a) further includes the step of, when an absolute differential value between signal levels of two pixels which are adjacent to each other along the horizontal pixel direction or the vertical pixel direction is equal to or less than a predetermined threshold, regarding said signal levels of adjacent two pixels as being the same.

4. The noise elimination method according to claim 3, wherein
   said threshold is variably set.

5. The noise elimination method according to claim 1, wherein
   when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0],
   a signal satisfying at least one of the following relational expressions (A1) and (A2) is detected as said zigzag signal in said step (a), and
   the zigzag signal is determined as forming said stripe pattern when at least one of the following relational expressions (A3) and (A4) is satisfied in said step (b)

$$I[0, -2] > I[0, -1] \text{ and } I[0, -1] < I[0, 0] \text{ and } I[0, 0] > I[0, 1] \qquad (A1)$$

$$I[0, -1] < I[0, 0] \text{ and } I[0, 0] > I[0, 1] \text{ and } I[0, 1] < I[0, 2] \qquad (A2)$$

$$I[-1, -1] < I[-1, 0] \text{ and } I[1, 0] > I[-1, 1] \qquad (A3)$$

$$I[1, -1] < I[1, 0] \text{ and } I[1, 0] > I[1, 1] \qquad (A4.)$$

6. The noise elimination method according to claim 1, wherein
   when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0],
   a signal satisfying at least one of the following relational expressions (B1) and (B2) is detected as said zigzag signal in said step (a), and
   the zigzag signal is determined as forming said stripe pattern when at least one of the following relational expressions (B3) and (B4) is satisfied in said step (b)

$$I[0, -2] < I[0, -1] \text{ and } I[0, -1] > I[0, 0] \text{ and } I[0, 0] < I[0, 1] \qquad (B1)$$

$$I[0, -1] > I[0, 0] \text{ and } I[0, 0] < I[0, 1] \text{ and } I[0, 1] > I[0, 2] \qquad (B2)$$

$$I[-1, -1] > I[-1, 0] \text{ and } I[-1, 0] < I[-1, 1] \qquad (B3)$$

$$I[1, -1] > I[1, 0] \text{ and } I[1, 0] < I[1, 1] \qquad (B4.)$$

7. The noise elimination method according to claim 5 or 6, wherein
   in said step (e), the noise signal is eliminated by correcting the signal level I[0, 0] at said current pixel in accordance with the following expression (C1) using a filter coefficient K(n) satisfying the following expression (C2)

$$I[0, 0] \leftarrow \sum_{n=-M/2}^{M/2} K(n) \times I[0, n] / 2^m \quad (C1)$$

(wherein M: even number, n: integer of 2 or more)

$$\sum_{n=-M/2}^{M/2} K(n) = 2^m. \quad (C2)$$

8. A noise elimination apparatus for eliminating a noise signal mixed into a two-dimensional image signal, comprising:

signal detecting part for detecting a zigzag signal in which a differential value between signal levels of two pixels which are adjacent to each other along a horizontal pixel direction or along a vertical pixel direction in said two-dimensional image signal alternately takes a positive value and a negative value;

determining part for determining whether or not said zigzag signal detected by said signal detecting part forms a stripe pattern;

noise signal extracting part for regarding the zigzag signal as a normal image signal when said zigzag signal is determined as forming a stripe pattern by said determining part, while regarding the zigzag signal as a noise signal and extracting the same when said zigzag signal is determined as not forming a stripe pattern; and a filter for eliminating said noise signal from said two-dimensional image signal.

9. The noise elimination apparatus according to claim 8, wherein
said filter is a low-pass filter which eliminates said noise signal by filtering.

10. The noise elimination apparatus according to claim 8 or 9, wherein
when an absolute differential value between signal levels of two pixels which are adjacent to each other along the horizontal pixel direction or the vertical pixel direction is equal to or less than a predetermined threshold, said signal detecting part regards said signal levels of adjacent two pixels as being the same.

11. The noise elimination apparatus according to claim 10, further comprising:
threshold setting part for variably setting said threshold.

12. The noise elimination apparatus according to claim 8, wherein
when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0],
said signal detecting part detects a signal satisfying at least one of the following relational expressions (A1) and (A2) as said zigzag signal, and said determining part determines the zigzag signal as forming a stripe pattern when at least one of the following relational expressions (A3) and (A4) is satisfied $I[0, -2]>I[0, -1]$ and $I[0, -1]<I[0, 0]$ and $I[0, 0]>I[0, 1]$ (A1)

$I[0, -1]<I[0, 0]$ and $I[0, 0]>I[0, 1]$ and $I[0, 1]<I[0, 2]$ (A2)

$I[-1, -1]<I[-1, 0]$ and $I[-1, 0]>I[-1, 1]$ (A3)

$I[1, -1]<I[1, 0]$ and $I[1, 0]>I[1, 1]$ (A4.)

13. The noise elimination apparatus according to claim 8, wherein when a signal level at a pixel located at i-th (i: integer) position in one of the vertical pixel direction and the horizontal pixel direction and at j-th (j: integer) position in the other of the vertical pixel direction and the horizontal pixel direction is expressed by I[i, j] and a signal level at a current pixel is expressed by I[0, 0], said signal detecting part detects a signal satisfying at least one of the following relational expressions (B1) and (B2) as said zigzag signal, and said determining part determines the zigzag signal as forming said stripe pattern when at least one of the following relational expressions (B3) and (B4) is satisfied $I[0, -2]<I[0, -1]$ and $I[0, -1]>I[0, 0]$ and $I[0, 0]<I[0, 1]$ (B1)

$I[0, -1]>I[0, 0]$ and $I[0, 0]<I[0, 1]$ and $I[0, 1]>I[0, 2]$ (B2)

$I[-1, -1]>I[-1, 0]$ and $I[-1, 0]<I[-1, 1]$ (B3)

$I[1, -1]>I[1, 0]$ and $I[0]I[1, 1]$ (B4.)

14. The noise elimination apparatus according to claim 12 or 13, wherein said filter eliminates the noise signal by correcting the signal level I[0, 0] at said current pixel in accordance with the following expression (C1) using a filter coefficient K(n) satisfying the following expression (C2)

$$I[0, 0] \leftarrow \sum_{n=-M/2}^{M/2} K(n) \times I[0, n] / 2^m \quad (C1)$$

(wherein M: even number, n: integer of 2 or more)

$$\sum_{n=-M/2}^{M/2} K(n) = 2^m. \quad (C2)$$

* * * * *